United States Patent [19]

Roberge

[11] Patent Number: 4,667,774
[45] Date of Patent: May 26, 1987

[54] BEVEL GEAR LUBRICATION AND COOLING

[75] Inventor: Gary D. Roberge, Jupiter, Fla.
[73] Assignee: United Technologies Corporation, Hartford, Conn.
[21] Appl. No.: 777,990
[22] Filed: Sep. 20, 1985
[51] Int. Cl.$^4$ ............................................. F01M 5/00
[52] U.S. Cl. ................................. 184/6.12; 184/6.22
[58] Field of Search ............... 184/6.12, 6.22, 15.2, 184/65; 74/467, 468

[56] References Cited

U.S. PATENT DOCUMENTS

| | | | |
|---|---|---|---|
| 3,515,011 | 6/1970 | Johnson | 74/467 |
| 3,548,971 | 12/1970 | Fisher | 184/6.12 |
| 3,738,452 | 6/1973 | Hausinger | 74/467 |
| 3,788,426 | 1/1974 | Hull | 184/13.1 |
| 4,414,861 | 11/1983 | Witt | 184/6.12 |
| 4,429,587 | 2/1984 | Finn | 74/467 |

FOREIGN PATENT DOCUMENTS 254228  8/1926  United Kingdom ............... 184/6.12

Primary Examiner—Carlton R. Croyle
Assistant Examiner—Jane E. Obee
Attorney, Agent, or Firm—James M. Rashid

[57] ABSTRACT

Lubrication of a pinion and bull gear arranged in a bevel gear orientation is accomplished by discharging a stream of lubricant through a nozzle and onto the surface of the pinion web section. Centrifugal forces due to rotation of the pinion cause the lubricant to spread radially outwardly on the web section surface and to form a film thereon. A portion of the lubricant is thrown off of the pinion as the pinion rotates, and strikes the teeth of the bull gear, thereby lubricating the contact surfaces of the bull gear teeth.

4 Claims, 3 Drawing Figures

BEVEL GEAR LUBRICATION AND COOLING

The Government has rights in this invention pursuant to contract number F33657-83-C-0092 awarded by the Department of the Air Force.

TECHNICAL FIELD

The present invention relates to gears, and more specifically, to the lubrication of bevel gears which rotate at high speeds.

BACKGROUND ART

As is well known in the art, gear systems find numerous applications in transferring the motion of one rotating shaft to another shaft. To prevent damage to the gear teeth contact surfaces, which may be caused by, e.g., excessive friction between meshing teeth while the gears rotate, a lubricant may be applied onto the contact surfaces. Typically, nozzles are arranged to discharge a constant flow of lubricant directly onto the teeth. The prior art shows arrangements where the lubricant strikes the teeth either before, after, or at the point where the teeth of one gear mesh with the teeth of another. See U.S. Pat. Nos. 1,309,113, 2,017,871, 2,302,822, 2,793,714, 2,840,186, 3,075,690, 3,146,629, 3,170,292, and 3,738,452. See also K. Fujita, et al., Journal of Engineering for Industry, Transaction of the ASME, Vol. 98, Series B, No. 2 (May 1976), pp. 635-644; G. van Heijningen, Tribology International, Vol. 17, No. 2 (Feb. 1984), pp. 11-18; and D. Dudley, Handbook of Practical Gear Design, McGraw-Hill, Inc., 1984, pp. 7.45-7.46, TJ184.D784. To maximize the depth that the lubricant is driven between the teeth of the rotating gears, the speed of the lubricant should approximate or exceed the rotational speed of the teeth, U.S. Pat. No. 1,717,814.

In a bevel gear arrangement shown in U.S. Pat. No. 3,788,426, lubricant is sprayed onto the teeth of rotating gears, at the point where the teeth mesh. Due to centrifugal forces, some of the lubricant is thrown off of the teeth. To limit the thrown off lubricant from striking other components within the gearbox, a perforate screen partially surrounds at least one of the gears. As the lubricant is thrown off of the gear surrounded by the screen, the lubricant strikes the screen, and loses most of its kinetic energy. The lubricant then drains into a sump from where it is scavenged and recirculated through the gearbox.

Van Heijningen notes that if the amount of lubricant thrown off of the gear teeth is significant, the mesh point may become starved of lubricant, which could lead to gear failure. However, he points out that operating efficiencies may decrease if the mesh point is flooded with too much lubricant in an attempt to compensate for lubricant throw off. According to R. Drago, Fundamentals of Gear Design, 1982, p. 9.24, if too much lubricant is supplied to the gear system, the lubricant may be violently churned by the gears, which could generate excessive, undesired heat within the gearbox.

Centrifugal forces are used to distribute lubricant throughout a gearbox in U.S. Pat. No. 4,429,587. Lubricant is directed into a hollow shaft of a gear, the shaft having channels which extend radially therethrough. During rotation of the gear, the lubricant moves radially outwardly through the channels due to centrifugal forces, and the channels direct the lubricant onto other gear components within the gearbox.

As the speeds and the load transferring requirements of gear systems increase, the need for more effective lubrication of gear teeth becomes apparent. Also, as operating conditions become more severe, more heat is generated in the gear system, and more effective means for removing the excess heat from the system are required. Accordingly, scientists and engineers are seeking new and improved ways to lubricate and maintain the temperature of gear systems.

DISCLOSURE OF THE INVENTION

An object of the present invention is a new and improved process and apparatus for lubricating a pinion and bull gear system arranged in a bevel gear orientation.

Another object of the present invention is an improved process and apparatus for distributing lubricating fluid onto the contact surfaces of the teeth of a pinion and bull gear rotating at high speeds.

Yet another object of the present invention is an improved process and apparatus for maintaining the temperature of the pinion within a desired temperature range.

According to the present invention, a pinion and bull gear are arranged in a bevel gear orientation, and rotate in meshing relation within a gearbox, and a nozzle is arranged to discharge a stream of lubricant onto the surface of the pinion web section while the pinion rotates, wherein the lubricant moves radially outwardly on the web section surface to form a film of lubricant thereon, and a portion of the lubricant on the web section surface is thrown off of the pinion and strikes the teeth of the bull gear. The thrown off lubricant has a linear speed which is approximately equal to the tangential speed of both the pinion outer surface and the gear outer surface; as a result of its high speed, the thrown off lubricant covers a significantly greater portion of the gear teeth contact surfaces than when applied using prior art lubrication techniques. Another portion of the thrown off lubricant strikes surrounding gear structure within the gearbox, thereby creating a suspension of lubricant droplets within the gearbox interior. The droplets cover the pinion and gear surfaces as they rotate, providing additional lubrication thereto.

The present invention is particularly useful when the pinion and bull gear rotate at high speeds. The high speed of the pinion is used to accelerate the lubricant to a speed wherein it can coat a significant portion of the contact surface of each gear tooth.

A primary feature of the present invention is that the speed of the thrown off lubricant, as it strikes the gear teeth, is substantially a function of the tangential speed of the pinion outer surface. As a result, it is not necessary to use complicated apparatus to discharge the lubricant at a high speed from the nozzle, as is necessary in the prior art when the lubricant is discharged directly against the gear teeth.

Another feature of the present invention is that the pinion web section surface is continuously covered by the lubricant film. In one aspect of the present invention, means are provided for controlling the temperature of the lubricant within a desired range. As a result, contact of the lubricant with the pinion maintains the bulk temperature of the pinion substantially within the desired lubricant temperature range.

The foregoing and other objects, features and advantages of the present invention will become more apparent in the light of the following detailed description of the preferred embodiments thereof as illustrated in the accompanying drawing.

BEST MODE FOR CARRYING OUT THE INVENTION

Figure 1:
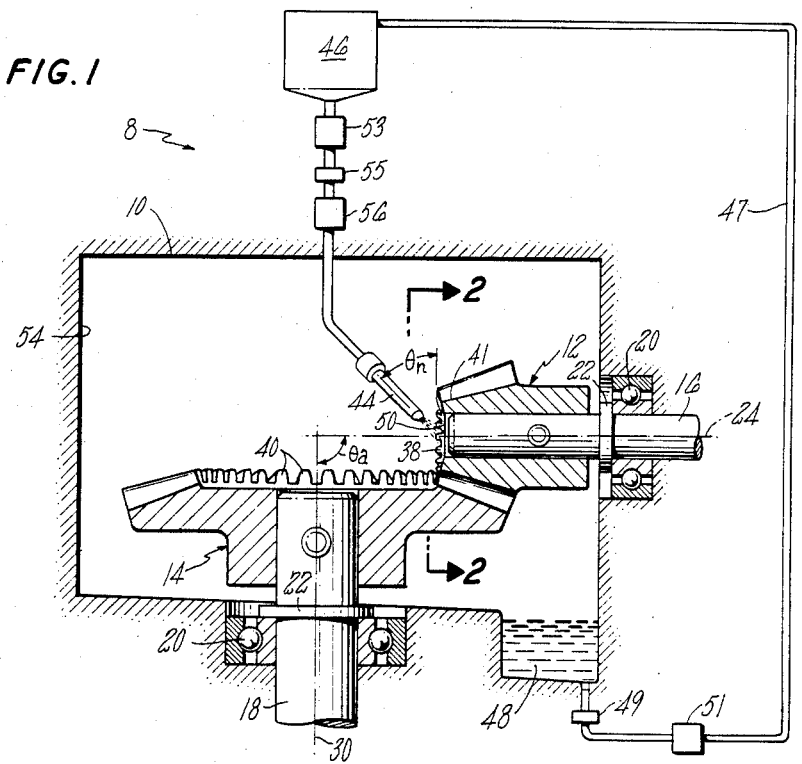
FIG. 1 is a simplified schematic view, partly broken away, showing a gear system which incorporates the features of the present invention.
Figure 2:
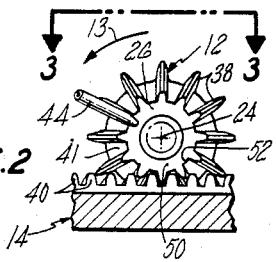
FIG. 2 is a cross sectional view, taken generally along the lines 2—2 of FIG. 1.
Figure 3:
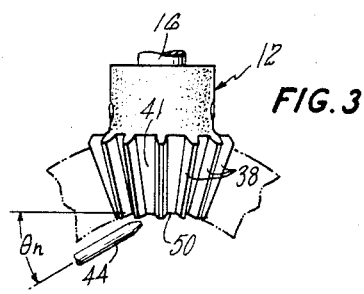
FIG. 3 is a cross sectional view, partly broken away, taken generally along the lines 3—3 of FIG. 2.

As an exemplary embodiment of the present invention, consider the gear system shown in FIGS. 1–3 and represented by the reference numeral 8. The gear system 8 includes a gearbox 10 supported from a structure by means not shown. The gearbox 10 houses a pinion 12 and a bull gear 14, arranged in a bevel gear orientation. The pinion 12 and gear 14 each have a shaft 16, 18, respectively, which is rotatably supported on the gearbox 10 by bearings 20 of any suitable type. Seals 22 are provided adjacent to the bearings 20 to prevent leakage of lubricating fluid past the bearings 20 and shafts 16, 18, and out of the gearbox 10.

The pinion 12 has an axis of rotation 24, a central web section 26 which extends radially outwardly from the axis 24, and a plurality of teeth 38 disposed about the pinion circumference. The web section extends from the axis of rotation 24 to the bottom land 41 between adjacent pinion teeth 38. Likewise, the bull gear 18 has an axis of rotation 30 and a plurality of teeth 40 disposed about the gear circumference. As is typical of bevel gear arrangements, in this embodiment, the diameter of the bull gear 14 is greater than the diameter of the pinion 12. The pinion 12 and bull gear 14 each have a plurality of teeth 38, 40, respectively, and the pinion 12 and gear 14 are arranged such that the pinion teeth 38 mesh with the gear teeth 40.

Drive means (not shown) are coupled to the pinion shaft 16 to rotate the pinion 12. In FIG. 2, the direction of rotation of the pinion is denoted by the arrow 13. When the drive means rotates the pinion 12, the meshing relation of the pinion teeth 38 with the gear teeth 40 causes the gear 14 to rotate with the pinion 12. During such rotation, the pitch line speed of the pinion is equal to the pitch line speed of the gear.

Lubricant is supplied to the interior of the gearbox 10 by a nozzle 44 which is in fluid communication with a pressurized reservoir 46. The lubricant discharged through the nozzle 44 eventually drains into an oil trap 48. A scavenge pump 49 forces the drained lubricant in the trap 48 through a deaerator 51, and back to the reservoir 46. From the reservoir 46, a pump 53 directs the lubricant through a filter 55 and the nozzle 44. In this embodiment, prior to passing through the nozzle 44, the lubricant passes through a cooler 56 which maintains the temperature of the lubricant within a desired temperature range. Such coolers 56 may include any of the various types of heat exchangers well known in the art.

The nozzle 44 discharges a stream of lubricant directly onto the surface 50 of the pinion web section 26. As a result, while the pinion 12 rotates, the lubricant moves radially outwardly on the web section surface 50 due to centrifugal forces, and forms a thin film of lubricant on the surface 50. Preferably, the nozzle 44 is arranged to direct the lubricant onto the surface 50 near the center of the web section 26, so that the lubricant spreads out radially from the center, and covers nearly all of the surface 50. As will become apparent from the discussion hereinbelow, most preferably, and as shown in FIG. 2, the nozzle 44 is arranged to direct the lubricant onto the portion of the web section 50 which precedes the mesh point of the teeth 38, 40.

As the pinion 12 rotates, and the lubricant moves radially outwardly on the web section surface 50, when the lubricant reaches the outer edge 52 of the web section 26, it is thrown off of the pinion 12. The thrown off lubricant moves away from the pinion 12 in a direction substantially tangential to the web section surface 50. It is believed that the speed of the thrown off lubricant can be approximated by, and is substantially equal to, the pitch line speed of the pinion. Since the pitch line speed of the pinion 12 is equal to the pitch line speed of the gear 14, the thrown off lubricant has a linear speed which is also substantially equal to the pitch line speed of the gear 14. A majority of the thrown off lubricant will strike surrounding gear structure, e.g., the inner walls 54 of the gearbox 10, or other gear components within the gearbox 10. Because of its high speed, when the lubricant strikes the surrounding structure, some of the lubricant will break up into fine droplets, and form a mist, or suspension of lubricant, within the gearbox interior. As the pinion 12 and gear 14 rotate, their surfaces will be covered by, and therefore, lubricated by, the droplets. Not all of the thrown off lubricant strikes surrounding gear structure. Due to the bevel gear orientation of the pinion and bull gear, some of the thrown off lubricant is thrown directly at the teeth of the bull gear, striking the teeth just prior to the mesh point. Because of its high speed, the thrown off lubricant travels to a substantial depth between the teeth of the rotating gear, and as a result, most of the contact, or load bearing surface of each gear tooth is covered by the lubricant.

It should be apparent that according to the teachings of the present invention, the speed of the lubricant as it strikes the bull gear teeth 40 is substantially independent of the speed of the lubricant as it is discharged from the nozzle 44. Rather, the thrown off speed is primarily a function of the pinion pitch line speed. (Windage around both the pinion 12 and gear 14 has some effect on the thrown off speed.) Thus, use of the present invention eliminates the need to use complicated apparatus to achieve a high discharge speed such as would be required if the lubricant were sprayed directly onto the gear teeth 40 by the nozzle 44, as is done in the prior art. If the pinion 12 has a very high pitch line speed, such high lubricant discharge speeds may not be achieved without significant expense.

The nozzle 44 should be oriented at an angle $\theta_n$ (FIGS. 1, 3) relative to the pinion web section surface 50 which will limit excessive splashing of the lubricant when it strikes the surface 50. For a given velocity, it is believed that splashing will be most severe when the nozzle 44 is generally perpendicular to the web section surface 50, or only slightly inclined relative to the surface 50. Therefore, it is preferred that the angle $\theta_n$ be within the range of about 30°–60°. Additionally, to maximize the amount of thrown off lubricant which strikes the teeth 40 of the bull gear 14, the bull gear axis of rotation 30 should be inclined relative to the axis 24 of the pinion 12 at an angle $\theta_a$ (FIG. 1) which is between about 75°–105°.

In a bevel gear system similar to that shown in FIG. 1, the diameter of the nozzle orifice is about 0.03 inches, and the lubricant reservoir includes means to pressurize the system to about 60 pounds per square inch, absolute. The pinion has a pitch diameter of about 5 inches, and rotates at about 25,000 revolutions per minute. The gear has a pitch diameter of about 8.7 inches, and rotates at about 14,400 revolutions per minute. The depth of each gear tooth, measured radially inwardly from the top land of each tooth to the bottom land between adjacent teeth, is about 0.265 inches. The angular distance between opposing gear tooth faces, measured midway between the tooth top land and the bottom land between adjacent teeth, is about 2.8 degrees. Therefore, for the gear to rotate 2.8° at 14,400 revolutions per minute takes about $3.3 \times 10^{-5}$ seconds.

According to Drago, Fundamentals of Gear Design, p. 9.24, the flow rate for a low viscosity fluid discharged through a nozzle can be approximated by the empirical formula $$F = 22 \, d^2 \, p^{0.5}$$

where
 F = flow rate of the lubricant, in gallons per minute
 d = diameter of the nozzle orifice, in inches
 p = pressure of the lubricant system, in pounds per square inch, absolute.

The velocity of such a lubricant stream can then be calculated according to the formula $$v_d = 3.056 \left( \frac{F}{d^2 \gamma} \right) \rho$$

where
 $v_d$ = discharge velocity, in feet per second
 $\gamma$ = specific weight of the lubricant, in pounds per cubic foot
 $\rho$ = density of the lubricant, in pounds per gallon.

Using these formulas, for a low viscosity lubricant, e.g., a lubricant which conforms to Military Specification MIL-L-23699B or MIL-L-7808J, F is about 6.7 pounds per second, and $v_d$ is about 70 feet per second.

If the lubricant, moving at 70 feet per second, is discharged from the nozzle directly against the gear teeth as is done in the prior art, the lubricant would travel, in $3.3 \times 10^{-5}$ seconds (the time it takes gear to rotate 2.8°) a distance of about $2.3 \times 10^{-3}$ inches, or about 9% of the tooth depth.

If, however, the lubricant is discharged at 70 feet per second onto the web section of the pinion according to the teachings of the present invention, the velocity of the thrown off lubricant, v, can be approximated by the pitch line velocity of the pinion, calculated by the formula $$v_p = \left( \frac{d}{2} \right) \omega$$

where
 $v_p$ = pitch line velocity of the pinion
 d = pitch diameter of the pinion
 $\omega$ = angular velocity of the pinion, in radians per second.

According to this formula, for the above described pinion rotating at 25,000 revolutions per minute, v is about 6,500 inches per second. At this speed, the lubricant would travel, in $3.3 \times 10^{-5}$ seconds (the time it takes for the gear to rotate 2.8°) a distance of about 0.215 inches, or about 80% of the tooth depth, a significantly greater depth than using the prior art techniques.

Because the lubricant covers a greater portion of the tooth load bearing surface, degradation of these surfaces due to friction and wear is reduced, which prolongs pinion and gear life, and thus, decreases maintenance costs of the gear system. Also, because a film of lubricant is always present on the pinion web section surface, the bulk temperature of the pinion is always substantially equal to the temperature of the lubricant.

It is believed that the present invention will be most useful when the methods shown in the prior art cannot discharge the lubricant at a high enough speed to prevent tooth degradation, or when the prior art methods cannot sufficiently remove the heat generated by the gear system. Such may be the case, for example, in the gearbox or gearbox drive of advanced gas turbine engines, where the pinion has a high pitch line speed, i.e., greater than about 30,000 feet per minute, and when the load being transferred from the pinion to the gear is greater than about 700 horsepower.

It should be recognized that it is within the scope of the present invention for the nozzle to be arranged to direct the lubricant stream onto the bull gear web section surface rather than onto the pinion web section surface. In this manner, the lubricant film would spread out radially on the gear web section surface, and a portion of the lubricant would be thrown off of the bull gear and strike the teeth of the pinion. However, the pinion generally has a smaller diameter than the gear, and thus rotates at a higher angular velocity than does the bull gear; also, each pinion tooth is contacted more frequently, per unit time, than is each bull gear tooth. It is therefore believed preferable to discharge the stream of lubricant directly onto the pinion, to take advantage of the cooling capability of the present invention.

Although the invention has been shown and described with respect with a prefered embodiment thereof, it should be understood by those skilled in the art that other various changes and omissions in the form and detail thereof may be made therein without departing from the spirit and scope of the invention.

I claim:

1. A gear system comprising a first gear, a second gear, and means for rotating said first gear at high speeds, wherein said first and second gears each have an axis of rotation, a central web section, and a plurality of teeth, said gears arranged in a bevel gear orientation such that said first gear teeth mesh with said second gear teeth, and rotation of said first gear causes said second gear to rotate therewith, said gear system also including an improved apparatus for lubricating said gears, said apparatus comprising:
 (a) a lubricant supply; and
 (b) a nozzle means in fluid communication with said supply, wherein said nozzle means is constructed and arranged to discharge a stream of lubricant directly onto said first gear web section, said gears arranged such that lubricant discharged onto said web section is thrown off said web section due to centrifugal forces while said gears rotate, and strikes said teeth of said second gear prior to the mesh point of said first gear teeth and said second gear teeth.

2. The gear system of claim 1, wherein said first gear is a pinion and said second gear is a bull gear.

3. The gear system of claim 2, wherein said axes of rotation intersect at an angle between about 75° and 105°, and said nozzle means is arranged to direct the stream of lubricant onto said pinion and near the axis said pinion, such that the stream of lubricant strikes said pinion web sections at an angle between about 30° and 60°.

4. The gear system of claim 3, wherein said lubricant supply includes means for controlling the temperature of the lubricant within a desired temperature range.

* * * * *